United States Patent
Langille et al.

(10) Patent No.: US 9,130,684 B2
(45) Date of Patent: Sep. 8, 2015

(54) SYSTEMS AND METHODS FOR CONSERVING ENERGY IN AN ENTERTAINMENT SYSTEM

(75) Inventors: Gary R. Langille, Greenwood Village, CO (US); Kate Megan Carney Landow, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 901 days.

(21) Appl. No.: 12/143,927

(22) Filed: Jun. 23, 2008

(65) Prior Publication Data

US 2009/0320055 A1 Dec. 24, 2009

(51) Int. Cl.
*H04H 60/32* (2008.01)
*H04H 60/33* (2008.01)
*H04H 20/42* (2008.01)
*G06F 1/32* (2006.01)

(52) U.S. Cl.
CPC ............ *H04H 60/33* (2013.01); *G06F 1/3206* (2013.01); *H04H 20/42* (2013.01)

(58) Field of Classification Search
USPC .......................................... 725/9–21, 37–61
See application file for complete search history.

(56) References Cited

U.S. PATENT DOCUMENTS

| | | | |
|---|---|---|---|
| 5,850,218 A * | 12/1998 | LaJoie et al. ................. 725/45 |
| 5,913,067 A | 6/1999 | Klein |
| 6,259,486 B1 * | 7/2001 | Mahvi ........................ 348/553 |
| 6,571,342 B1 * | 5/2003 | Detlef .......................... 713/323 |
| 2001/0010095 A1 * | 7/2001 | Ellis et al. ...................... 725/44 |
| 2002/0129368 A1 * | 9/2002 | Schlack et al. ................. 725/46 |
| 2003/0053002 A1 * | 3/2003 | Griesau et al. ................ 348/734 |
| 2003/0208755 A1 * | 11/2003 | Zimmerman ................... 725/34 |
| 2006/0020972 A1 * | 1/2006 | Regan et al. .................... 725/46 |
| 2006/0053311 A1 | 3/2006 | Chary |
| 2006/0064729 A1 | 3/2006 | Steading |
| 2006/0078298 A1 * | 4/2006 | Nishikawa et al. ............ 386/83 |
| 2006/0109384 A1 * | 5/2006 | Miller-Smith et al. ....... 348/730 |
| 2007/0044119 A1 | 2/2007 | Sullivan |
| 2007/0216538 A1 * | 9/2007 | Thelen et al. ............ 340/825.69 |
| 2008/0148337 A1 * | 6/2008 | Laville et al. ................. 725/151 |
| 2008/0168267 A1 * | 7/2008 | Bolen et al. .................... 713/100 |
| 2009/0052859 A1 * | 2/2009 | Greenberger et al. .......... 386/46 |

FOREIGN PATENT DOCUMENTS

| | | | | |
|---|---|---|---|---|
| EP | 1617315 | * | 1/2006 | ............... G06F 1/32 |
| EP | 1617315 A1 | | 1/2006 | |
| MX | 2010013836 A | | 2/2011 | |
| WO | 2004/057862 A1 | | 7/2004 | |
| WO | 2010/008763 A2 | | 1/2010 | |

OTHER PUBLICATIONS

ISR mailed on Feb. 4, 2011 for PCT/US2009/047908 filed on Jun. 19, 2009.

(Continued)

*Primary Examiner* — John Schnurr
*Assistant Examiner* — Michael Telan
(74) *Attorney, Agent, or Firm* — Kilpatrick Townsend & Stockton LLP

(57) ABSTRACT

Apparatus, systems and methods are described for conserving energy in an entertainment system. An entertainment device tracks usage patterns of a user over time while outputting presentation content and utilizes the collected information to determine whether to automatically enter a low power mode state at appropriate times.

14 Claims, 5 Drawing Sheets

(56) References Cited

OTHER PUBLICATIONS

Minkyoung Kim et al, "Behavior Coordination Mechanism for Intelligent Home", Computer and Information Science, 2006, International Conference on Honolulu, HI, USA, Jul. 10-12, 2006.

International Preliminary Report on Patentability for PCT/US2009/047908 issued Feb. 15, 2011, all pages.
Canadian Office Action for Application No. 2,727,201 dated Apr. 10, 2014, all pages.
Canadian Office Action for Application No. 2,727,201 dated May 14, 2015, 4 pages.

* cited by examiner

SYSTEMS AND METHODS FOR CONSERVING ENERGY IN AN ENTERTAINMENT SYSTEM

BACKGROUND

Video service providers, such as cable providers and satellite television providers, often provide subscribers with an external television receiver (also known as a set-top box) that is utilized to receive television content and provide the television content to an associated television receiver. Television receivers are often complex devices that require a significant amount of energy to operate. However, it is a problem that users often forget to turn-off the television receiver after completing viewing of a television program. Often, the user turns-off the television, but forgets to turn-off the television receiver. For example, a viewer may leave for work, turn-off the television, but forget to turn-off the television receiver. Thus, the television receiver continues to operate in an active state all day, outputting video content to the television that is turned off, and drawing a significant amount of energy for no reason.

As a solution to this problem, many television receivers now include an inactivity timer. The television receiver operates to shut-off automatically after a specified period of time if no user input (e.g., channel change requests, requests to view an electronic programming guide and the like) is received within the specified period of time. However, a viewer may watch a particular program for a significant amount of time without providing any input to the television receiver. For example, a viewer may watch football without changing the channel or otherwise providing input to the television receiver for four hours or more. A viewer may become very upset if a television receiver shuts off automatically during a particular program, especially if the television receiver shuts off during the last play of a football game. Thus, the interval for activation of the inactivity timer is often selected to correspond with the maximum expected time length of programming viewable by a user (e.g., four hours for a sporting event).

In many cases though, the use of a single time interval for activating an inactivity timer results in energy wastage. For example, a user may leave the television receiver on in the morning after leaving for work, and the television receiver may not shut off automatically until four hours after the user stopped watching television. Similarly, the user may leave the television receiver on in the evening after they go to bed. Again, the television receiver may shut off automatically four hours after the user stops watching television. In the described example, the television receiver is left on unnecessarily for eight hours a day, resulting in a significant waste of energy by the television receiver.

BRIEF DESCRIPTION OF THE DRAWINGS

The same number represents the same element or same type of element in all drawings.

DETAILED DESCRIPTION

Figure 1:
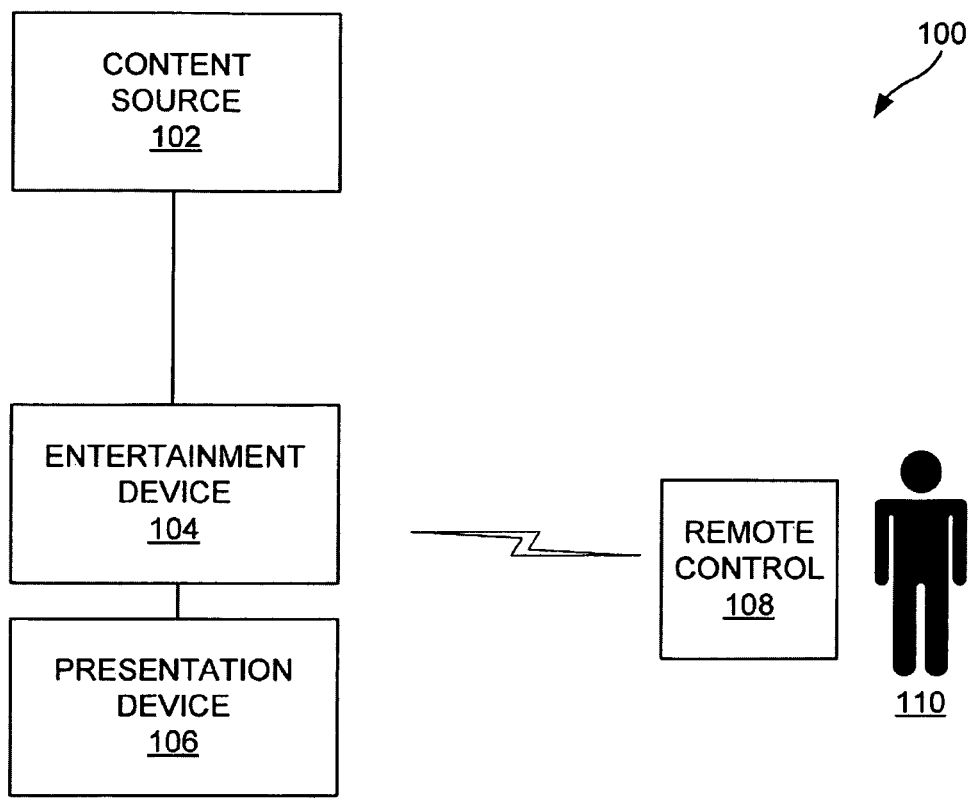
FIG. 1 illustrates an embodiment of an entertainment system.

The various embodiments described herein generally provide apparatus, systems and methods for conserving energy in an entertainment system. More particularly, an entertainment device tracks usage patterns of a user over time and utilizes the collected information to automatically enter a low power mode state at appropriate times. As used herein, a low power mode state may refer to any reduced power state of components of an entertainment device, including a standby state, a sleep mode state or an off state. By entering the low power mode state automatically at flexible times based on usage patterns, the entertainment device achieves optimized energy savings without the need for user intervention. In short, the various embodiments described herein provide an entertainment device that automatically enters a low power mode state based on an evaluation of usage data collected during multiple user sessions.

The entertainment device may comprise any type of device or system that outputs content for presentation on an associated presentation device (e.g., an external television receiver that outputs video content to a television) or that is integrated with a presentation device (e.g., a television receiver integrated with a television). In at least one embodiment, an entertainment device comprises a television receiver that receives video content from a television distribution system and outputs the television programming to a television or other type of display device. However, the teachings described herein may be applied to other entertainment devices, including stereos, digital video recorders (DVRs) and the like. During the output of presentation content, the entertainment device monitors and aggregates usage data regarding the entertainment device. In at least one embodiment, the entertainment device collects usage data during multiple user sessions, and evaluates the usage data to generate a profile including usage characteristics of a user or users of the entertainment device.

For example, the entertainment device may track when a user typically watches programming on particular days of the week, what programming the user typically watches, when the user typically provides user input to the entertainment device (e.g., powers-on the device, changes the channel, views an electronic programming guide) and the like. The entertainment device may process the usage data to determine when to enter a low power mode state. In at least one embodiment, the entertainment device establishes one or more activity timers and/or low power mode timers (e.g., timers that activate powered-off, sleep and/or stand-by states), which may be expressed in relative or absolute times, responsive to processing the usage data. For example, an inactivity timer may be activated to place the entertainment device into a low power mode state at an absolute time of 8:30 A.M. in the morning each day after the user leaves for work. Also, the entertainment device may be operable to activate the inactivity timer to enter a low power mode state at a relative time during specific times of the day, such as 15 minutes after the last user input received during output of a news program in the morning. In at least one embodiment, the entertainment device applies rules during evaluation of the aggregated usage data to determine a period for the inactivity timers and/or to otherwise determine whether to automatically enter a low power mode state.

The usage data may indicate that different inactivity timers are applicable at different times or in different scenarios.

Thus, in at least one embodiment, the entertainment device evaluates the usage data in association with present operating parameters of the entertainment device, such as the time, date and/or present programming being outputted, to determine when to enter the low power mode state. For example, if the entertainment device typically outputs a news program each morning, then the entertainment device may enter a low power mode state at 8:00 A.M. each day after the news program commences. However, if the entertainment device is presently outputting a sporting event during a particular user session in the morning, then the entertainment device may determine that entering the low power mode state at 8:30 A.M. is not appropriate, and may select another appropriate inactivity timer and/or time to enter the low power mode state.

FIG. 1 illustrates an embodiment of an entertainment system 100. The entertainment system 100 presents content to a user 110. The entertainment system 100 includes a content source 102, an entertainment device 104, a presentation device 106 and a remote control 108. Each of these components is discussed in greater detail below. The entertainment system 100 may include other devices, components or elements not illustrated for the sake of brevity.

The content source 102 is operable for receiving, generating and/or communicating content to an entertainment device 104. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the entertainment device 104. For example, the entertainment device 104 may comprise a television receiver (e.g., a set-top box), and the content source 102 may comprise a satellite, cable, broadband or terrestrial television distribution system. It is to be appreciated that the content source 102 may receive practically any form and/or type of information from one or more sources including streaming television programming, recorded audio or video, electronic programming guide data and the like. Exemplary content sources 102 include television distribution systems (e.g., over-the-air transmission facilities, cable television distribution headends and satellite television uplink centers), broadband or internet servers and the like.

The entertainment device 104 is operable to receive content from the content source 102, and to output the received content for presentation by the presentation device 106. In at least one embodiment, the presentation device 106 is a display device (e.g., a television) configured to display content to a user. The entertainment device 104 may receive an audio/video stream in any format (e.g., analog or digital format), and output the audio/video stream for presentation by the presentation device 106. In at least one embodiment, the entertainment device 104 comprises a television receiver that receives and demodulates television signals that are outputted for display on a display device (e.g., a television). As used herein, a television receiver may also be referred to as a set-top box, which is a television receiver that is located externally with respect to a display device. The entertainment device 104 may be further configured to output menus and other information that allow a user to control the output of video content by the entertainment device 104. In some embodiments, the entertainment device 104 and the presentation device 106 may be integrated as a device combining the functionality of a display device and a set-top box, digital video recorder (DVR) or the like.

In at least one embodiment, the content source 102 and the entertainment device 104 may be integrated into one or more units. For example, the entertainment device 104 and the content source 102 may comprise a stereo that outputs audio content from files (e.g., MP3s) stored on a storage medium, audio content stored on an optical disk (e.g., compact disks (CDs) and digital-versatile disks (DVDs)) and other types of removable storage mediums. In at least one embodiment, the entertainment device 104 comprises a digital video recorder (DVR), media server, DVD player or the like that outputs stored video content for presentation by the presentation device 106.

The presentation device 106 may be any device configured to receive an audio/video stream from the entertainment device 104 and present the audio/video stream to a user. Examples of the presentation device 106 include a television, a video monitor, or similar device capable of presenting audio and video information to a user. The entertainment device 104 may be communicatively coupled to the presentation device 106 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 106 may be integrated within the entertainment device 104. For example, a cable-ready television may include a converter device for receiving audio/video streams from the content source 102 and displaying the audio/video streams to a user 110.

The remote control 108 may comprise any system or apparatus configured to remotely operate the entertainment device 104 and/or the presentation device 106. In at least one embodiment, the remote control 108 may manipulate the output of content by the entertainment device 104. The entertainment device 104 and the remote control 108 may communicate using any type of communication medium and any type of communication protocol. For example, the remote control 108 may wirelessly communicate with the entertainment device 104 over a radio frequency (RF) or infrared (IR) communication link.

In at least one embodiment, the remote control 108 receives user input from the user 110 requesting to remotely control the entertainment device 104. For example, the user input may request to manipulate playback of content outputted for presentation by the entertainment device 104. The user 110 may provide the user input by pressing one or more buttons of the remote control 108. In at least one embodiment, the remote control 108 identifies the pressed button and generates a key code corresponding with the pressed button. The generated key code is transmitted by the remote control 108 to the entertainment device 104. The entertainment device 104 receives the key code and performs appropriate processing functions based on the key code (e.g., changing its operation or manipulating playback of content).

The entertainment device 104 is additionally operable to generate or aggregate usage data regarding the output of content by the entertainment device 104. The usage data may include any type of information regarding the usage of the entertainment device 104. The usage data may include viewing characteristics, which in some embodiments may be tracked by the time of day, the day of the week, the length of for particular viewing sessions, the programs watched, the time spent viewing each program and/or any combination thereof. More particularly, the usage data may be collected during multiple viewing sessions by the user 110.

For example, a user 110 may wake-up each morning and activate the entertainment device 104 and the presentation device 106 at 7:00 A.M. in order to watch the news as they get ready for work. Some mornings, the user 110 may deactivate (e.g., power-off) the entertainment device 104 and/or the presentation device 106 at 8:00 A.M. as they leave for work. It will be appreciated that the term power-off, as used herein, may refer to shutting off a device or placing the device into a low power mode state. The user may also typically watch television each evening between 6:30 P.M. and 10:00 P.M., and similarly power-off the entertainment device 104 some evenings at 10:00 P.M., occasionally forgetting to power-off the entertainment device 104 before going to bed. Thus, the usage data, collected during a plurality of viewing sessions, may indicate that the user 110 typically watches television from 7:00 A.M. to 8:00 A.M. in the morning, and 6:30 P.M. to 10:00 P.M. in the evening.

The entertainment device 104 is further operable to evaluate the usage data to determine whether to automatically enter a low power mode state. For example, in the above described example, the entertainment device 104 may enter the low power mode state at 8:15 A.M. responsive to evaluating the usage data, rather than waiting four hours for the activation of a traditional inactivity timer. In at least one embodiment, the entertainment device 104 may aggregate multiple types of usage data and evaluate one or more of the types of usage data to determine whether to automatically enter the low power mode state.

For example, the usage data may include time of day viewing habits as well as day of week viewing habits. In other words, the entertainment device 104 may differentiate between the viewing habits of users not only at specific times of the day, but on specific days as the week. Thus, the entertainment device 104 may account for different viewing habits on days that the user 110 is working versus days that the user 110 is off from work.

Figure 2:
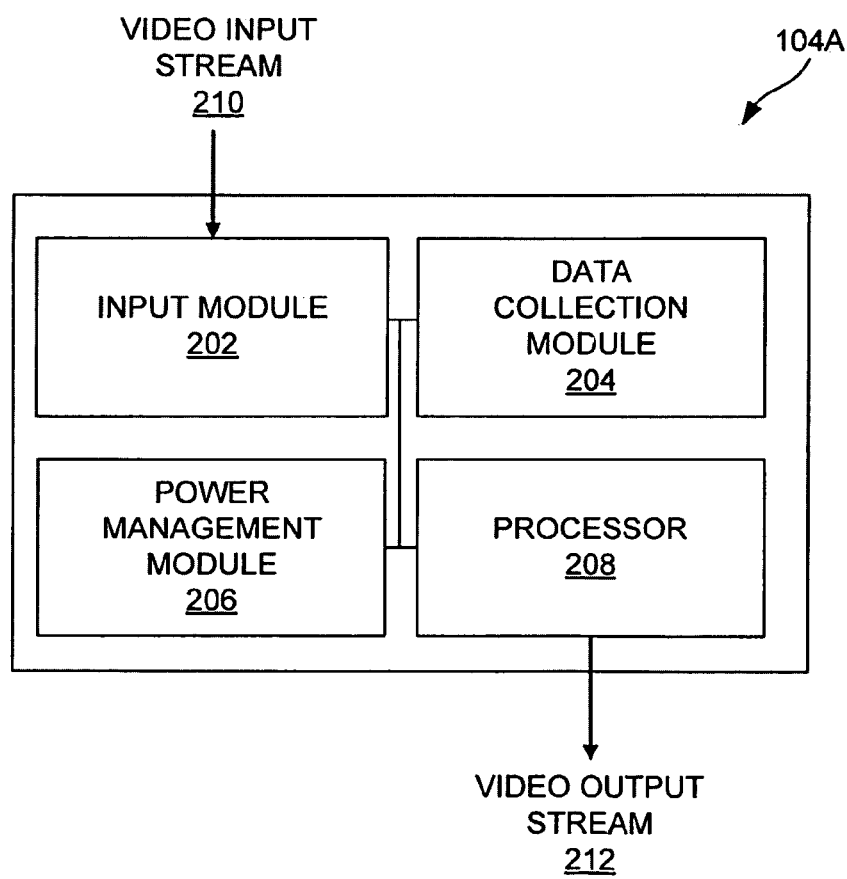
FIG. 2 illustrates the entertainment device of FIG. 1 embodied as a television receiver.

FIG. 2 illustrates the entertainment device 104 of FIG. 1 embodied as a television receiver 104A. The television receiver 104A will be discussed in reference to the entertainment system 100 of FIG. 1. The television receiver 104A includes an input module 202, a data collection module 204, a power management module 206, and a processor 208. Each of these components will be discussed in greater detail below. The television receiver 104A may include other elements, components or devices not illustrated for the sake of brevity.

The input module 202 is operable to receive the video input stream 210 from the content source 102 (see FIG. 1). In at least one embodiment, the input module 202 comprises a tuner operable to receive and tune any type of television signal. For example, the input module 202 may receive an over-the-air broadcast signal, a direct broadcast satellite signal, a cable television signal and/or an internet delivered video signal and tune the video input stream 210 to extract selected television programming.

The data collection module 204 is operable to monitor and aggregate usage data regarding the television receiver 104A. More particularly, the data collection module 204 aggregates usage data during multiple sessions. The data may comprise any type of usage data regarding the use of the television receiver 104A and the output of content by the television receiver 104A, such as the usage data types described above in conjunction with FIG. 1. The data collection module 204 may collect any granularity of usage data depending on desired design criteria.

In at least one embodiment, users of the television receiver 104A may provide identifying information to the television receiver 104A for each viewing session. For example, users may login to the television receiver 104A each time the television receiver 104A is powered-on. Thus, usage data may be tracked on a per user basis to allow the power management module 206 to perform an evaluation of the usage data attributable to particular users The power management module 206 is operable to control the power consumption of the television receiver 104A. In other words, the power management module 206 is operable to command various components of the television receiver 104A, such as the input module 202, the data collection module 204 and/or the processor 208, to enter or exit a low power mode state based on an evaluation of the usage data aggregated by the data collection module 204. The power management module 206 may be embodied as a separate hardware device within the television receiver 104A, or may be embodied as software operating on a general purpose processor of the television receiver 104A, such as the processor 208.

The television receiver 104A further includes a processor 208 operable to receive video content, e.g., video input stream 210 and responsively output a video output stream 212 for presentation by the presentation device 106. The processor 208 may also be referred to herein as an output interface module. The processor 208 may be operable for receiving and outputting any type of presentation content. For example, the processor 208 may receive and output an over-the-air broadcast signal, a direct broadcast satellite signal or a cable television signal. In some embodiments, the processor 208 may receive or retrieve content from a storage medium, such as an optical disk, internal or external hard drive, a portable storage device (e.g., universal serial bus (USB) memory sticks) and the like. The processor 208 may also receive content from external servers, such as video servers, that are communicatively coupled to the television receiver 104A over the internet or other types of data networks.

The processor 208 may operate to perform various signal and data processing functions such as demodulation, decoding, decryption and the like on data signals received via any type of network interface, to generate an appropriate format video stream (e.g., video output stream 212) for output to the presentation device 106 (see FIG. 1). The processor 208 may comprise multiple components, such as a demodulator, an audio decoder, a video decoder, a data decoder and/or a graphics processor to generate the video stream. Commands received from the remote control 108 are operable to control the output of audio and video content by the processor 208. For example, the processor 208, via an associated receiver or transceiver (not shown in FIG. 2), may receive a key code causing processor 208 to manipulate the output of the video content responsive to the key code. The key codes may include, for example, requests to change a channel, requests to view recorded content, requests to view an electronic programming guide, requests to activate a picture-in-picture (PIP) mode of the television receiver 104A and the like. The processor 208 operates, responsive to the key codes, to output the video output stream 212 for presentation by the presentation device 106. The video stream generated by the processor 208 may include menus, electronic programming guides and the like that are navigable using commands received from the remote control 108.

As described above, the power management module 206 evaluates usage data aggregated by the data collection module 204, over multiple viewing sessions, to determine whether to automatically command components of the television receiver 104A, such as the processor 208 and/or the input module 202, to enter a low power mode state. In at least one embodiment, the power management module 206 applies one or more rules during the evaluation of the usage data to determine whether to command the output interface module to enter the low power mode state. The power management module 206 may utilize any type of artificial intelligence, heuristic rules, fuzzy logic or the like in evaluating the usage data to determine whether to command components of the television receiver 104A to enter the low power mode state.

In at least one embodiment, the power management module 206 evaluates the usage data in association with present operating parameters of the television receiver 104A to determine whether to automatically place components of the television receiver 104A (e.g., the processor 208) to enter a low power mode state. Exemplary operating parameters include the time that the television receiver 104A was powered-on, the particular channel and/or program being watched, when the user 110 last requested to view an electronic programming guide, the last user input command received, the particular user 110 utilizing the television receiver 104A and the like. In some embodiments, the television receiver 104A evaluates the usage data and the present operating parameters to predict when the user completed watching the television programming outputted by the processor 208.

The embodiments described below illustrate examples of how the power management module 208 may evaluate the usage data to determine whether to enter a low power mode state. In the described examples, the power management module 206 utilizes the following usage data collected by the data collection module 204. A user 110 watches television each weekday morning prior to leaving for work. They typically turn on the television at approximately 7:00 A.M., and change the channel, if necessary, to view the desired news program. They otherwise do not change the channel or provide any other input, via the remote control 108 (see FIG. 1) to the television receiver 104A during the duration of the news program, which is broadcast between 7:00 A.M. and 8:00 A.M.

Each morning before leaving for work, the user 110 powers-off the presentation device 106, but only sporadically powers-off the television receiver 104A. On days in which the user 110 does not power-off the television receiver 104A, the television receiver 104A enters a low power mode state after a predetermined duration of time since the last received user input. In the described example, the pre-determined duration of time is 4 hours since the last received user input. The user's 110 morning schedule for the first two viewing weeks is illustrated below.

TABLE #1

User morning viewing characteristics

| Day | Powered-on | Powered-off |
|---|---|---|
| Week #1 | | |
| Monday | 7:00* | 8:01 |
| Tuesday | 6:58* | 7:55 |
| Wednesday | 7:03* | Receiver shuts-off automatically at 11:03 |
| Thursday | 7:10* | 8:03 |
| Friday | 6:57* | Receiver shuts-off automatically at 10:57 |
| Saturday | 10:00# | 12:30 |
| Sunday | | No TV watching in morning |
| Week #2 | | |
| Monday | 7:03* | Receiver shuts-off automatically at 11:03 |
| Tuesday | 7:00* | Receiver shuts-off automatically at 11:00 |
| Wednesday | 6:59* | 8:00 |
| Thursday | 7:30# | 8:15 |
| Friday | 6:57* | Receiver shuts-off automatically at 10:57 |
| Saturday | 9:30# | 10:20 |
| Sunday | | No TV watching |

*Indicates that the user watched channel 3
Indicates that the user watched channel 32

After the data collection module 204 aggregates usage data for two weeks, the power management module 206 begins evaluating the usage data to determine whether to automatically command the processor 208 to enter a low power mode state at a particular time in the morning. For example, as the table illustrates above, the user 110 typically watches channel 3, each morning, from approximately 7:00 A.M. to 8:00 A.M. The following examples illustrate scenarios in which the power management module 206 may evaluate the usage data above.

Example #1

On Monday of week #3, the user powers-on the television receiver 104A at 7:05 A.M. and begins watching channel 3. The user 110 then leaves for work and forgets to turn-off the television receiver 104A. The above described usage data indicates that the user 110 likely intended to stop watching the television program at approximately 8:00 A.M. Thus, the power management module 206 determines that 8:05 A.M. is an appropriate time to command the processor 208 to enter the low power mode state based on an evaluation of the usage data. The processor 208 thus enters the low power mode state responsive to a command from the power management module 206 at 8:05 A.M.

Example #2

On Tuesday of week #3, the user powers-on the television receiver 104A at 7:35 A.M. and begins watching channel 32. The program presently broadcast on channel 32 runs from 6:00 to 10:00 each morning. The power management module 206 determines that the usage data indicates that the user does not intend to power-off the device at 8:00 A.M. Because of the limited information regarding the user's 110 viewing of channel 32, the power management module 206 determines that 10:05 A.M., which is after the end of the program presently broadcast on channel 32, is an appropriate time to command the processor 208 to enter a low power mode state. The processor 208 thus enters the low power mode state at 10:05 A.M.

Example #3

On Friday of week #3, the user 110 powers-on the television receiver at 7:00 A.M. and begins watching channel 3. At 7:55 A.M., the user 110 changes the channel and begins watching channel 32. At 9:30 A.M. the user 110 again changes the channel, and begins watching a movie on channel 72 that ends at 11:30 A.M., and then provides no additional user input to the television receiver 104A. Thus, the power management module 206 determines that 11:45 A.M., which is after the movie ends on channel 72, is an appropriate time to command the processor 208 to enter the low power mode state. The power management module 206 selects 11:45 A.M. as an appropriate deactivation time to allow the user 110 with an additional 15 minutes, after the end of the movie on channel 72, to provide additional user input to the television receiver 104A. Since no additional user input is provided, it is likely that the user is no longer watching programming outputted by the television receiver 104A.

Example #4

On Saturday of week #3, the user 110 powers-on the television receiver at 7:30 A.M. and begins watching channel 3. The news program broadcast on channel 3 between 7:00 A.M.

and 8:00 A.M. is immediately followed by the broadcast of a movie between 8:00 A.M. and 10:00 A.M. Based on evaluation of the usage data, the power management module 206 determines that the rules applied on Monday-Friday for turning off the television receiver 104A automatically at 8:05 A.M. if channel 3 is presently being outputted may not apply on Saturdays because of differences in viewing habits of the user 110 on weekdays and weekends. Thus, the power management module 206 processes both the usage data, and present operating parameters of the television receiver 104A (e.g., the date) to determine an appropriate time interval for the inactivity timer. For example, the power management module 206 may determine that 10:05 A.M., following the end of the movie, may be an appropriate time to command the processor 208 to enter a low power mode state. Thus, if no additional user input is received by the television receiver 104A prior to 10:05 A.M., then the processor 208 enters a low power mode state at 10:05 A.M.

In the described examples, the television receiver 104A evaluates the usage data to achieve more optimal energy savings compared with utilizing a default inactivity timer of four hours. For example, on Monday, the television receiver 104A saves 3 hours of energy consumption by entering the low power mode state automatically based on an evaluation of the previous weeks' usage data. Likewise, the television receiver 104A saves 1.5 hours of energy consumption on Tuesday, and 1.75 hours of energy consumption on Friday. Taken over months of time, the saved energy consumption saved becomes significant.

As described above, some present operating parameters of the television receiver 104A may be evaluated by the power management module 206 when determining whether to command the processor 208 to enter a low power mode state. In at least one embodiment, an operating parameter evaluated by the power management module 206 may include when the user 110 last requested to view an electronic programming guide. For example, on Monday of week #4, the user 110 powers-on the television receiver 104A at 7:10 A.M., and begins watching channel 3. At 7:57 A.M., the user 110 requests to view an electronic programming guide and browses through various programs that are to be broadcast on other channels starting at 8:00 A.M. The user 110 then exits the electronic programming guide and resumes viewing of channel 3.

Normally, the television receiver 104, based on an evaluation of the usage data, may command the processor 208 to enter a low power mode state at 8:05 A.M., after the news program on channel 3 commences. However, the request for the electronic programming guide may indicate that the user 110 does not intend to commence viewing of television programming at 8:00 A.M. Thus, the power management module 206 may determine that another program is broadcast on channel 3 from 8:00 A.M. to 8:30 A.M. The power management module 206 may then determine that 8:35 A.M. is an appropriate time to command the processor 208 to enter the low power mode state. If no additional user input is received from the user 110 by 8:35 A.M., then the power management module 206 commands the processor 208 to enter the low power mode state.

Continuing with the previous example, the user 110 subsequently provides user input to the television receiver 104A at 8:31 A.M. For example, the user 110 may request to switch from channel 3 to channel 9. Thus, the power management module 206 subsequently evaluates the present operating parameters of the television receiver 104A, in association with the usage data, to adjust an absolute or relative time of an inactivity timer. For example, the power management module 206 may adjust the inactivity timer for the processor 208 to enter the low power mode state after completion of the television program presently airing on channel 9 at 8:31 A.M.

The described examples illustrate that the power management module 206 is operable to provide dynamically adjustable inactivity timers depending on usage data and operating parameters of the television receiver 104A. Thus, rather than utilizing a pre-defined inactivity time interval, such as 4 hours, the power management module 206 may adjust the inactivity timer depending on the present situation, providing more optimal energy conservation while minimizing possible interruptions to the user 110.

Further, differing rules may be applied by the power management module 206 at different times of the day. For example, the usage data during the morning may allow for the implementation of more rigid rules utilized by the power management module 206 to command the processor 208 to enter the low power mode state than the rules applied at night. This may occur because viewing characteristics of the user 110 during the morning are more rigid and defined than the viewing characteristics of the user 110 at night. For example, the user 110 may turn-off or otherwise stop watching television programming outputted by the processor 208 at various times each night depending on what particular program the user 110 is watching. However, over time, the power management module 206 may evaluate the usage data for each night of the week, and may implement different rules for handling the activation of inactivity timers for each night depending on the type of programming that the user 110 watches each night.

In at least one embodiment, the power management module 206 may evaluate the present operating parameters of the television receiver 104A to determine whether the television receiver 104A is presently downloading and/or outputting for presentation a video-on-demand movie or other downloaded content. For example, the power management module 206 may determine that the input module 202 is presently downloading a video file or other content from a remote content source. Thus, it may be inappropriate for the television receiver 104A to enter a low power mode state during the pendency of the download. In at least one embodiment, the power management module 206 is operable to monitor the download through the input module 202 and command that processor 208 to enter a low power mode state responsive to completion of the download.

For example, the television receiver 104A may be in the process of downloading a 5 GB movie at 1.5 MB/s. Thus, the movie takes approximately 57 minutes to download. The power management module 206 monitors the input module 202 and determines that the movie download is 20% complete. Based upon the information collected from the input module 202, the power management module 206 determines that the television receiver 104A should remain in a full power mode state for at least 46 minutes. Thus, an activity timer may be set-up for 55 minutes to allow a user sufficient time to provide user input to the television receiver 104A after completion of the download. In at least one embodiment, the power management module 206 periodically monitors the download by the input module 202 and adjusts the period of the activity timer based on the percentage completion of the download. For example, if the download is proceeding at a faster rate than expected by the input module 202, then it may be appropriate to reduce the period of the inactivity timer. Likewise, if the download is proceeding slower than expected, then the power management module 206 may similarly increase the interval of the input module 206 an appropriate length of time.

If the user is watching a video-on-demand (VOD) or pay-per-view (PPV) movie, then, it may be inappropriate for the television receiver 104A to enter a low power mode state during the playback of the VOD or PPV movie. In at least one embodiment, the power management module 206 is operable to determine whether the processor 208 is presently outputting the VOD or PPV movie. In at least one embodiment, the determination is made based on user input received from the remote control 108. For example, the user 110 may request to view a VOD or PPV movie using the remote control 108. The power management module 206 may then set a flag or other type of indicator responsive to the command received from the remote control 108, and utilize the indicator to determine whether to command the processor 208 to enter the low power mode state.

In another embodiment, the video input stream 210 may include information identifying that video input stream 210 as VOD or PPV content. Thus, the power management module 206 may evaluate the information in the video input stream 210 to determine whether to command the processor 208 to enter a low power mode state. For example, MPEG data, metadata, electronic programming guide data or the like may indicate that the video input stream 210 is VOD or PPV content. The power management module 206 evaluates the video type information to select an appropriate inactivity timer for the television receiver 104A.

In at least one embodiment, the power management module 206 determines the remaining presentation time of the VOD or PPV video and selects a timer to command the processor 208 to enter a low power mode state after completion of the movie. For example, the movie may have a remaining presentation time of 50 minutes and the inactivity timer may be set for 65 minutes to provide ample time for the user to provide input after completion of the movie. In another embodiment, the power management module 206 may periodically query the input module 202 and/or processor 208 to determine whether the processor 208 is still outputting the VOD or PPV movie. If the processor 208 has completed output of the VOD or PPV movie, then the power management module 206 may evaluate other data, as described above, to determine whether to command the processor 208 to enter the low power mode state. However, in at least one embodiment, if the processor 208 is still outputting the PPV or VOD movie, then the power management module 206 may loop around and perform the same query at a future specified interval.

It is to be appreciated that that the various functional elements 202 through 208 shown as operable within the television receiver 104A may be combined into fewer discrete elements or may be broken up into a larger number of discrete functional elements as a matter of design choice. Thus, the particular functional decomposition suggested by FIG. 2 is intended merely as exemplary of one possible functional decomposition of elements within the television receiver 104A.

Figure 3:
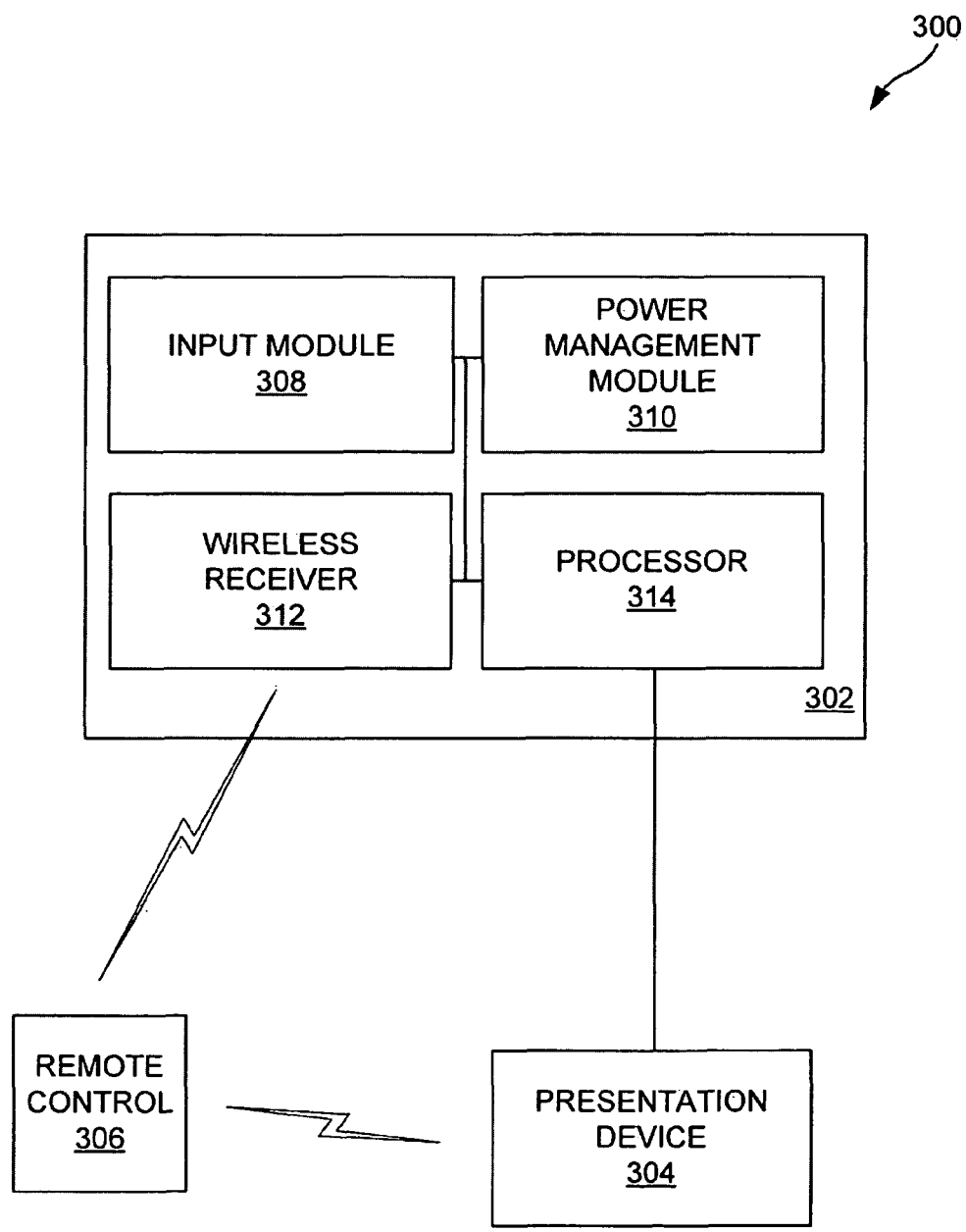
FIG. 3 illustrates an embodiment of an entertainment system.

In another embodiment, a television receiver or other type of entertainment device may be configured to enter a low power mode state automatically if an associated presentation device is powered-off. For example, a satellite television receiver may be powered-off automatically responsive to a user powering-off an associated television. FIG. 3 illustrates an embodiment of an entertainment system 300. The entertainment system 300 includes an entertainment device 302, a presentation device 304 and a remote control 306. Each of these components is discussed in greater detail below. The entertainment system 300 may include other components, elements or devices not illustrated for the sake of brevity.

The entertainment device 302 is operable to output presentation content to the presentation device 304. In at least one embodiment, the entertainment device 302 comprises a television receiver that outputs a video signal to a television or other type of presentation device 304. A user inputs commands, via the remote control 306, to wirelessly control the entertainment device 302 and/or the presentation device 304. Commands may include, for example, requests to power-on/off the entertainment device 302 and/or the presentation device 304, requests to change channels outputted by the entertainment device 302, requests to view an electronic programming guide, and the like. The commands utilized to remotely control the entertainment device 302 may be independent of the commands utilized to remotely control the presentation device 304. In at least one embodiment, the remote control 306 outputs a unique key code to power-on/off the presentation device 304.

The presentation device 304 is similar to the presentation device 106 of FIG. 1. Likewise, the remote control 306 is similar to the remote control 108 of FIG. 1. Further discussion of the presentation device 304 and the remote control 306 is omitted herein for the sake of brevity.

The entertainment device 302 includes an input module 308, a power management module 310, a wireless receiver 312 and a processor 314. The input module 308 is operable to receive presentation content from a content source (not shown in FIG. 3), and is similar to the input module 202 of FIG. 2. The processor 314 is operable to output a presentation stream 314 to the presentation device 304, and is similar to the processor 208 of FIG. 2.

The power management module 310 is operable to control the power consumption of the entertainment device 302. The power management module 310 is operable to command various components of the entertainment device 302, such as the input module 308 and/or the processor 314, to enter or exit a low power mode state based on an operating state of the presentation device 304. In other words, the power management module 310 is operable to determine whether the presentation device 304 has entered an off-state, and commands other components (e.g., the processor 314) to enter a low power mode state responsive to determining that the presentation device 314 has entered the off-state. The power management module 310 may be embodied as a separate hardware device within the entertainment device 302, or may be embodied as software operating on a general purpose processor of the entertainment device 302, such as the processor 314.

In at least one embodiment, the power management module 310 determines that the presentation device 304 is operating in the off-state by monitoring key-codes transmitted by the remote control 306 to the presentation device 304. For example, the presentation device 304 may respond to a unique key code from the remote control 306 that responsively powers-off the presentation device 304. If the wireless receiver 312 receives the unique key code, then the power management module 310 responsively determines that the presentation device 304 is in a powered-off state. In some embodiments, the presentation device 304 may respond to the same key-code to both power-on and power-off. Thus, the power management module 310 may store a counter or some other type of value that indicates whether the previous key-code from the remote control 306 was requesting to power-on or power-off the presentation device 304. Each successive presentation device 304 power function key-code received from the remote control 306 may alternate the value or counter. When the value indicates that the presentation device 304 is powered-off, then the power management module 310 responsively commands the processor 314 to enter a low power mode state.

In at least one embodiment, the power management module 310 includes measurement circuitry for measuring impedance or the like of the presentation device 304 to determine whether the presentation device 304 is in an off-state. An appropriately selected impedance threshold may be selected to indicate whether the presentation device 304 is in an off-state. The threshold may be selected based on any desired design criteria. If the measurement indicates that the presentation device 304 is in an off-state, then the power management module 310 responsively commands the processor 314 to enter a low power mode state.

In at least one embodiment, the power management module 310 is configured to periodically query the presentation device 304 for the operating state of the presentation device 304. The query may be transmitted over any type of wired or wireless connection between the entertainment device 302 and the presentation device 304. In at least one embodiment, the query and a response to the query may be transmitted over a wired connection utilized by the processor 314 to output content to the presentation device 304. The power management module 310 receives the response to the query and responsively determines whether to automatically command the processor 314 to enter a low power mode state.

In at least one embodiment, the detection functionality of the power management module 310 is combined with the usage data evaluation of the power management module 206 of FIG. 2. For example, the power management module 206 may evaluate an operating state of the presentation device 304, usage data regarding the entertainment device 302, the present operating parameters of the entertainment device 302 or any combination thereof to determine whether to command the processor 314 to enter a low power mode state.

Figure 4:
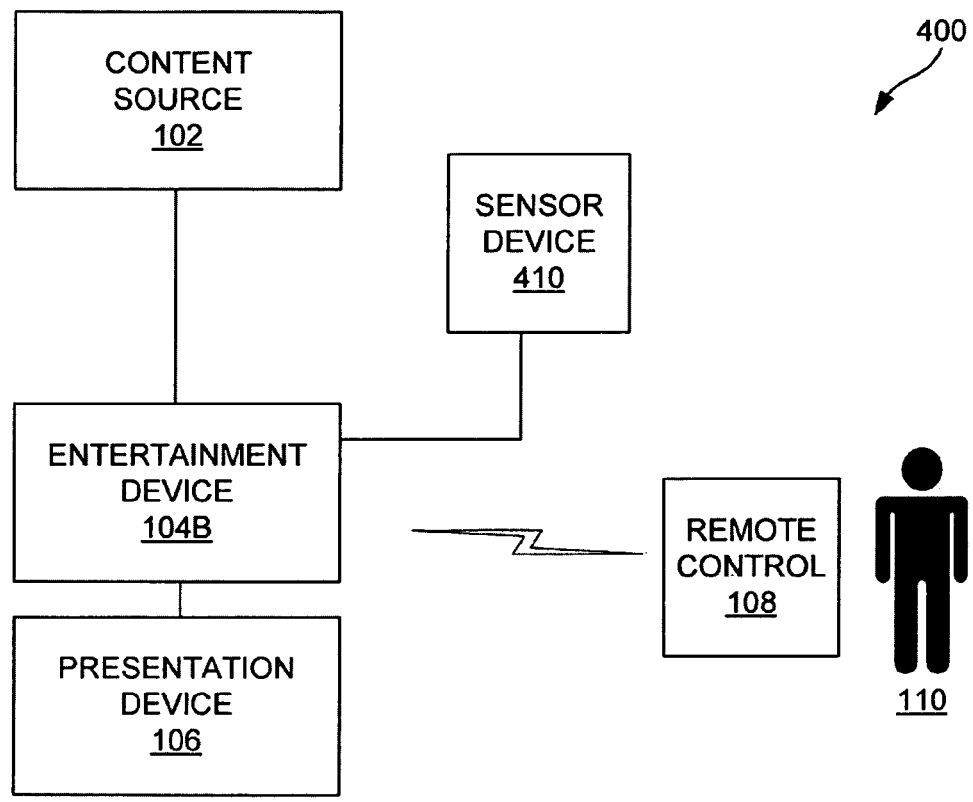
FIG. 4 illustrates an embodiment of an entertainment device including a sensor device for monitoring usage by a user.

In at least one embodiment, an entertainment device may evaluate data collected by motion sensors or other devices within a structure to determine whether to enter a low power mode state. FIG. 4 illustrates an embodiment of an entertainment device 400 including a sensor device 410 for monitoring usage by a user 110. The entertainment system 400 includes a content source 102, an entertainment device 104B, a presentation device 106, a remote control 108 and a sensor device 410. Each of these components is discussed in greater detail below. Discussion of components common to FIGS. 1-3 is omitted herein for the sake of brevity.

The entertainment device 104B is similar to the entertainment device 104 of FIG. 1. The entertainment device 104B is operable to query and/or receive sensing information from the sensor device 410 and process the sensing information. In at least one embodiment, the sensor device 410 comprises a motion sensor that detects motion within a room. For example, the motion sensor may be a component of a lighting system within a home. The motion sensor provides motion sensing information to the entertainment device 104B. The entertainment device 104B processes the motion sensing information to determine whether to enter a low power mode state.

For example, the entertainment device 104B receives information from the sensor device 410 that indicates that the user 110 has left the room. If the user 110 remains out of the room for a specified period of time (e.g., 30 minutes), then the entertainment device 104B may enter a low power mode state. Other types of sensing information may also be evaluated by the entertainment device 104B. For example, information from door sensors, locks, security systems and the like may be evaluated by the entertainment device 104B to determine whether to enter a low power mode state.

In at least one embodiment, the sensor device 410 is associated with the entertainment device 104B. In other embodiments, the sensor device 410 may be associated with other systems, such as lighting systems, security systems and the like. The entertainment device 104B and the sensor device 410 may be communicatively coupled through any type of communication medium. In at least one embodiment, the entertainment device 104B and the sensor device 410 are communicatively coupled through a power line communication network (e.g., a HomePlug connection).

The entertainment device 104B may evaluate the sensing information in association with usage data as described above to determine whether to enter a low power mode state. For example, viewing characteristics may indicate that the user 110 watches the news every morning as described above. Sensing information 410 may further indicate that the user 110 leaves the room at approximately the same time each morning. Thus, after aggregating viewing characteristics and sensing information over a period of time, the entertainment device 104B may determine that sensing information regarding the user 110 leaving the room in the morning indicates that the user 110 has completed their viewing session. Therefore, the entertainment device 104B may enter a low power mode state responsive to receiving sensing information from the sensor device 410 that indicates that the user 110 has left the room for a specified period of time.

In at least one embodiment, sensing information may be aggregated and associated with particular time periods, such that the entertainment device 104B evaluates the sensing information with different rules at different times of the day or different days of the week. For example, sensing information regarding the user 110 leaving the room at 8:00 A.M. may indicate that the user 110 has left for work. By contrast, sensing information regarding the user 110 leaving the room at 10:00 P.M. may indicate that the user 110 has left the bedroom to grab a snack in the kitchen. By evaluating the usage data in association with the sensing information, the entertainment device 104B may more accurately when whether to enter a low power mode state without interrupting a viewing session of the user 110.

Figure 5:
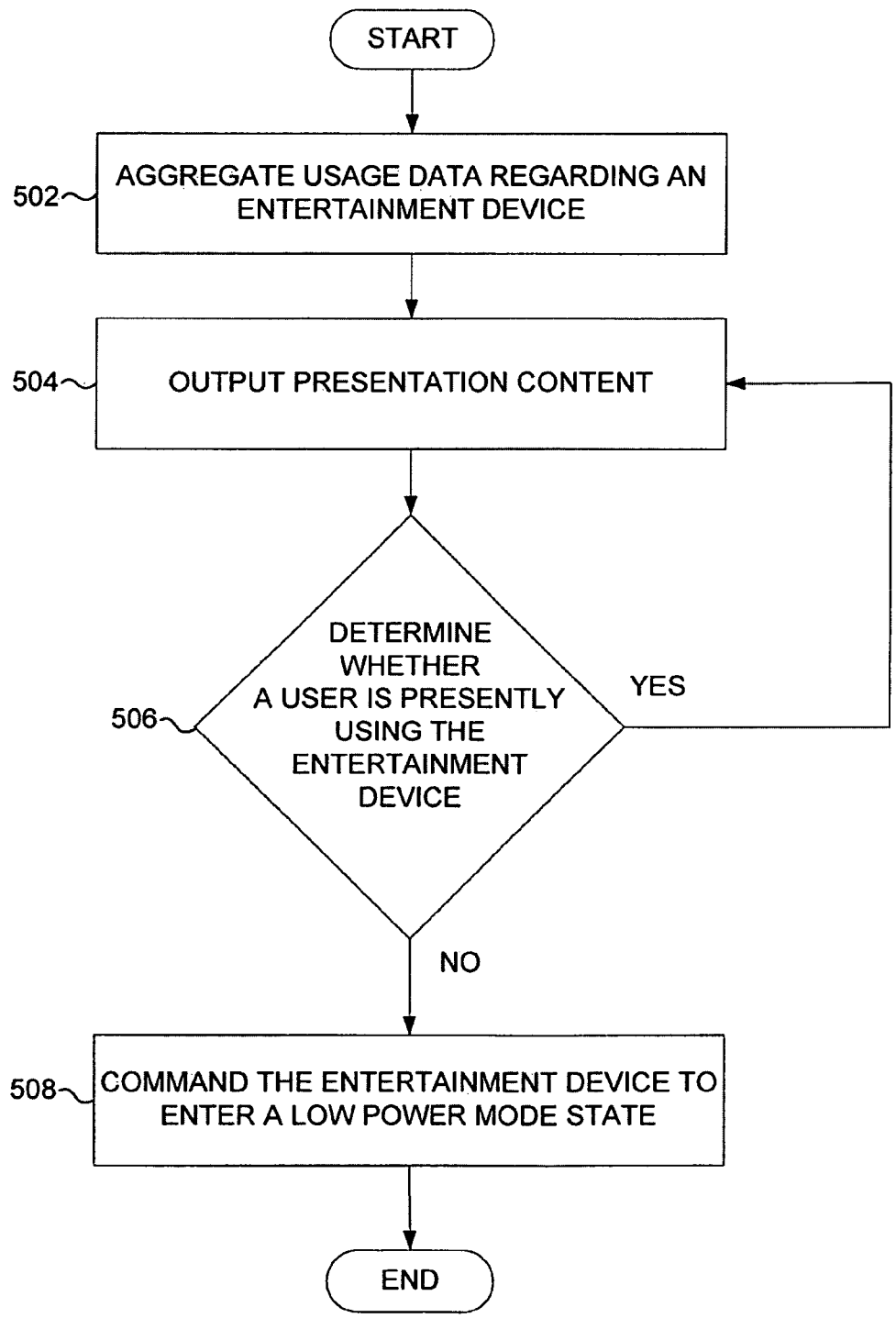
FIG. 5 illustrates an embodiment of a method for placing an entertainment device into a low power mode state.

FIG. 5 illustrates an embodiment of a method for placing an entertainment device into a low power mode state. More particularly, FIG. 5 illustrates a method for placing an entertainment device into a low power mode state when a user is not using the entertainment device. The method of FIG. 5 may include other processes not illustrated for the sake of brevity.

The process includes aggregating usage data regarding an entertainment device (operation 502). The usage data may be aggregated over a plurality of user sessions. The usage data may comprise user viewing characteristics or any other type of data as described above. For example, the usage data may include time of day viewing characteristics, day of the week viewing characteristics and the like. In some embodiments, multiple types of usage data may be aggregated by an entertainment device.

The process further includes outputting presentation content for presentation on an associated presentation device (operation 504). The process further includes evaluating the usage data and present operating parameters of the entertainment device based on at least one rule to determine whether a user is presently using the entertainment device (operation 506). In some embodiments, the evaluation may comprise determining a probability that the user is using the entertainment device (e.g., presently watching a program) based on past viewing characteristics, the presently outputted television program and/or the last received user input. In at least one embodiment, a first evaluation may be performed using first usage data and the present operating parameters to determine whether the user is presently using the entertainment device. Similarly, a second evaluation may be performed using the second usage data and the present operating parameters to determine whether the user is presently using the entertainment device. The determination regarding whether the user is presently using the entertainment device may based on the results of the first evaluation, the second evaluation, or any combination thereof.

If a determination is made that the user is not presently using the entertainment device, then the method further comprises commanding components of the entertainment device to enter a low power mode state (operation 508). However, if a determination is made that the user is presently using the entertainment device, then the process loops back to operation 504. In some embodiments, the process further includes repeating the determination made in operation 506 until such time that the entertainment device is powered-off.

Although specific embodiments were described herein, the scope of the invention is not limited to those specific embodiments. The scope of the invention is defined by the following claims and any equivalents therein.

We claim:

1. An entertainment device comprising:
   an input module that receives presentation content from a content source;
   an output interface module communicatively coupled to the input module that outputs the presentation content for presentation by a presentation device;
   a data collection module that aggregates usage data regarding the entertainment device during multiple user sessions, wherein at least two of the user sessions comprise first and second instances of similar presentation content viewed on different days for which low-power state events differed between a user-initiated low-power event and a first timer trip event; and
   a power management module coupled to the output interface module and the data collection module that
      comprises the first timer configured to automatically enter the entertainment device into a low-power state after a predetermined first period of time,
      processes the usage data to determine user viewing habits specific to the instances of similar presentation content viewed on different days, to predict when the user completed watching a third instance of the similar presentation content,
      determines, based on the user viewing a third instance of the similar presentation content, a probability that the user will complete viewing the third instance of the similar presentation content at a time comparable to the user-initiated low-power event collected from the first instance of the similar presentation content, and
      determines, based on the determined probability, to automatically command the output interface module to enter a low power mode state at a time related to a time of the user-initiated low-power event collected from the first instance of the similar presentation content.

2. The entertainment device of claim 1, wherein the output interface module aggregates a plurality of types of usage data, and wherein the power management module evaluates the plurality of types of usage data and present operating parameters of the entertainment device to determine whether to command the output interface module to enter the low power mode state.

3. The entertainment device of claim 1, wherein the power management module evaluates the usage data and a time to determine whether to command the output interface module to enter the low power mode state.

4. The entertainment device of claim 1, wherein the power management module evaluates the usage data and a date to determine whether to command the output interface module to enter the low power mode state.

5. The entertainment device of claim 1, wherein:
   the presentation content comprises television programming;
   the power management module evaluates the usage data and a presently outputted television program to determine whether to command the output interface module to enter the low power mode state.

6. The entertainment device of claim 1, wherein the power management module evaluates the usage data and a last received user input to determine whether to command the output interface module to enter the low power mode state.

7. The entertainment device of claim 6, wherein the last received user input comprises a request to view an electronic programming guide.

8. The entertainment device of claim 1, wherein the power management module receives sensing information from a sensor device and evaluates the sensing information and the usage data to determine whether to command the output interface module to enter a low power mode state based on the usage data.

9. A television receiver comprising:
   an input module that receives video content from a content source;
   an output interface communicatively coupled to the input module that outputs the video content for presentation on a presentation device;
   a data collection module that aggregates multiple types of usage data regarding the entertainment device during multiple user sessions, wherein the usage data includes at least two user sessions comprising a similar television program viewed on different days for which a low-power state was entered for the television receiver for at least one of the events by a user-initiated low-power event; and
   a power management module that is coupled to at least the output interface module and the data collection module and that
   includes a timer configured to automatically enter the television receiver into a low-power state after a predetermined period of user inactivity,
   evaluates the multiple types of usage data and present operating parameters of the television receiver to predict when the user will complete viewing of a third user session comprising the similar television program viewed on a third day, and
   determine to automatically command the output interface module to enter a low power mode state based on the prediction, wherein the prediction provides a time similar to an occurrence time of the user session for which the low-power state of the television receiver was enacted by the user-initiated low-power event.

10. The television receiver of claim 9, wherein the multiple types of usage data include time of day viewing characteristics of the entertainment device and day of the week viewing characteristics of the entertainment device.

11. The television receiver of claim 9, wherein the present operating parameters include a presently outputted television program.

12. The television receiver of claim 9, wherein the power management module is operable to determine an operating state of the presentation device, and wherein the power management module evaluates the operating state of the presentation device in association with the usage data and the present operating parameters of the television receiver to determine whether to automatically command the output interface module to enter the low power mode state.

13. The entertainment device of claim 9, wherein the power management module evaluates the usage data and a date to determine whether to command the output interface module to enter the low power mode state.

14. The entertainment device of claim 9, wherein the power management module:
- determines that the video content received by the input module is video-on demand content; and
- commands the output interface module to enter the low power mode state responsive to completion of the video-on-demand content.

* * * * *